United States Patent [19]

Pringle

[11] 4,241,600
[45] Dec. 30, 1980

[54] BRAKE SHOE ASSEMBLY, APPARATUS AND METHOD FOR MAKING SAME

[75] Inventor: William L. Pringle, Grosse Pointe Shores, Mich.

[73] Assignee: Leonard Friedman, Beverly Hills, Calif.

[21] Appl. No.: 970,326

[22] Filed: Dec. 18, 1978

[51] Int. Cl.³ .............................................. B21D 45/00
[52] U.S. Cl. ........................................ 72/411; 72/427
[58] Field of Search .................. 113/116 Q, 116 HH; 72/411, 418, 427

[56] References Cited

U.S. PATENT DOCUMENTS

| | | | |
|---|---|---|---|
| 1,362,708 | 12/1920 | Lang | 148/12.4 |
| 1,470,399 | 10/1923 | Smith | 72/411 |
| 1,921,210 | 8/1933 | Ziska | 72/411 |

Primary Examiner—Lowell A. Larson
Attorney, Agent, or Firm—McGlynn and Milton

[57] ABSTRACT

A brake shoe assembly and an apparatus and method for making same wherein the brake shoe includes a pair of spaced parallel arcuate ribs having outside radii secured to the underside of an arcuate plate with the inside radii of the arcuate ribs having a greater thickness than the outside radii. In accordance with the apparatus and method for making the brake shoe assembly, a straight length of rectangular bar stock having opposite faces is bent into an arcuate shaped member while maintaining the bar stock substantially flat with the opposite faces extending transversely to the axis of bending at a bending station. Subsequently, a plurality of holes are pierced between the opposite faces of the arcuate member at a piercing station. Thereafter, the outside periphery of the opposite faces of the arcuate member are trimmed at a trimming station to a predetermined arcuate rib configuration including a predetermined outside radius with a semicircular portion at one end of the arcuate rib concentric with a hole therein and a notch disposed in the other end of the arcuate rib. Finally, the concentric hole at one end of the arcuate rib and the notch at the other end define working surfaces which are finished to a predetermined machined finish at a finishing station.

6 Claims, 10 Drawing Figures

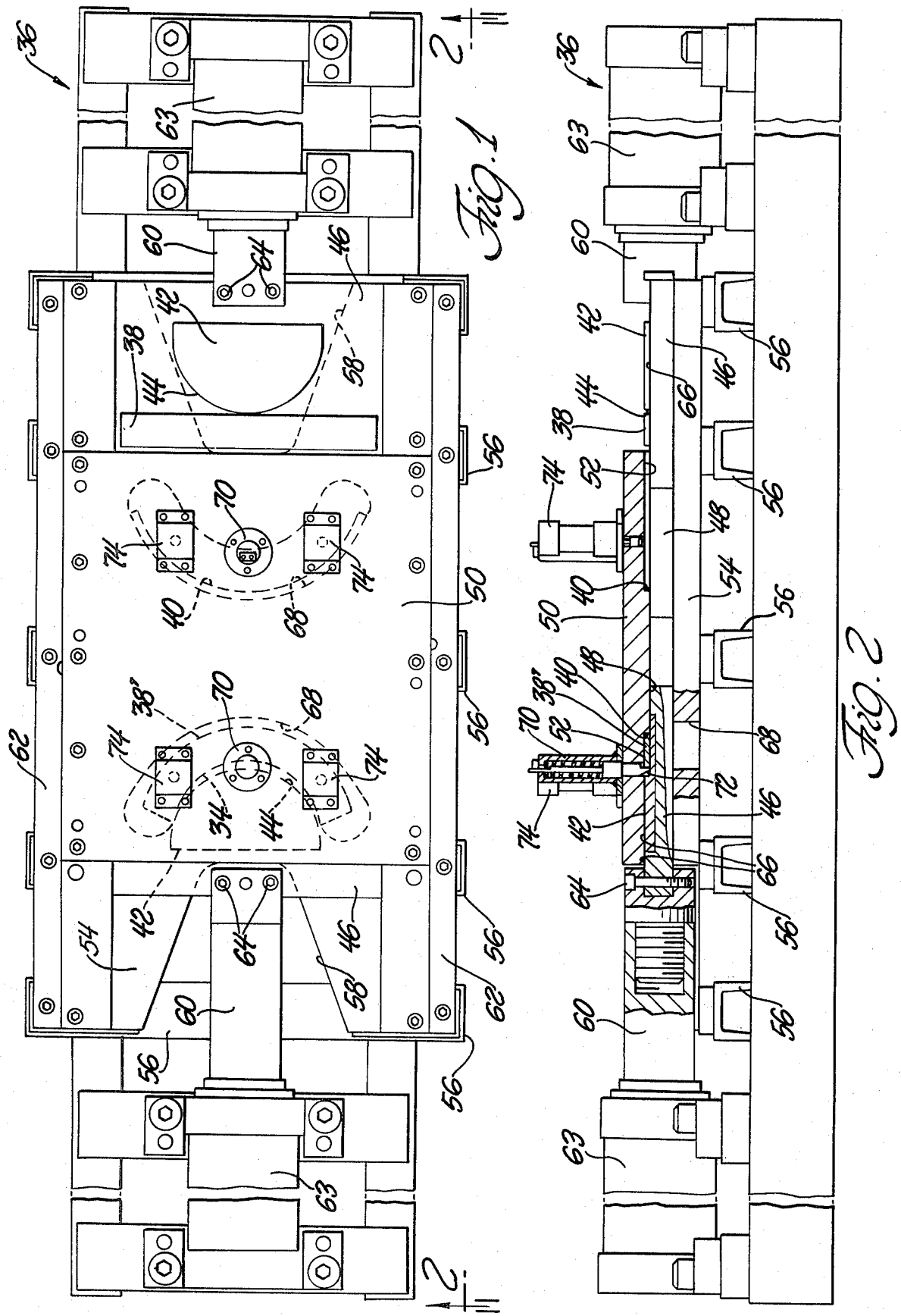

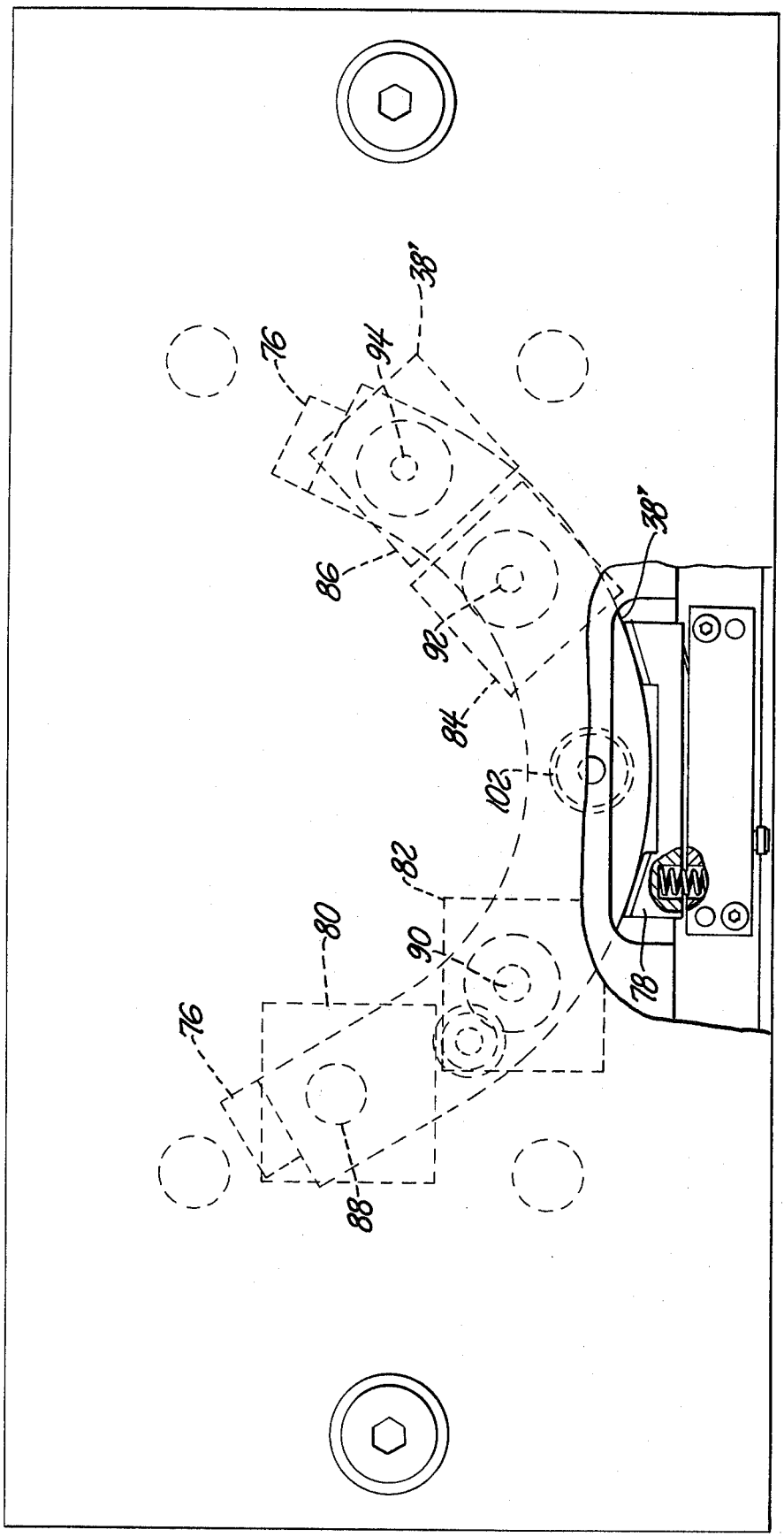

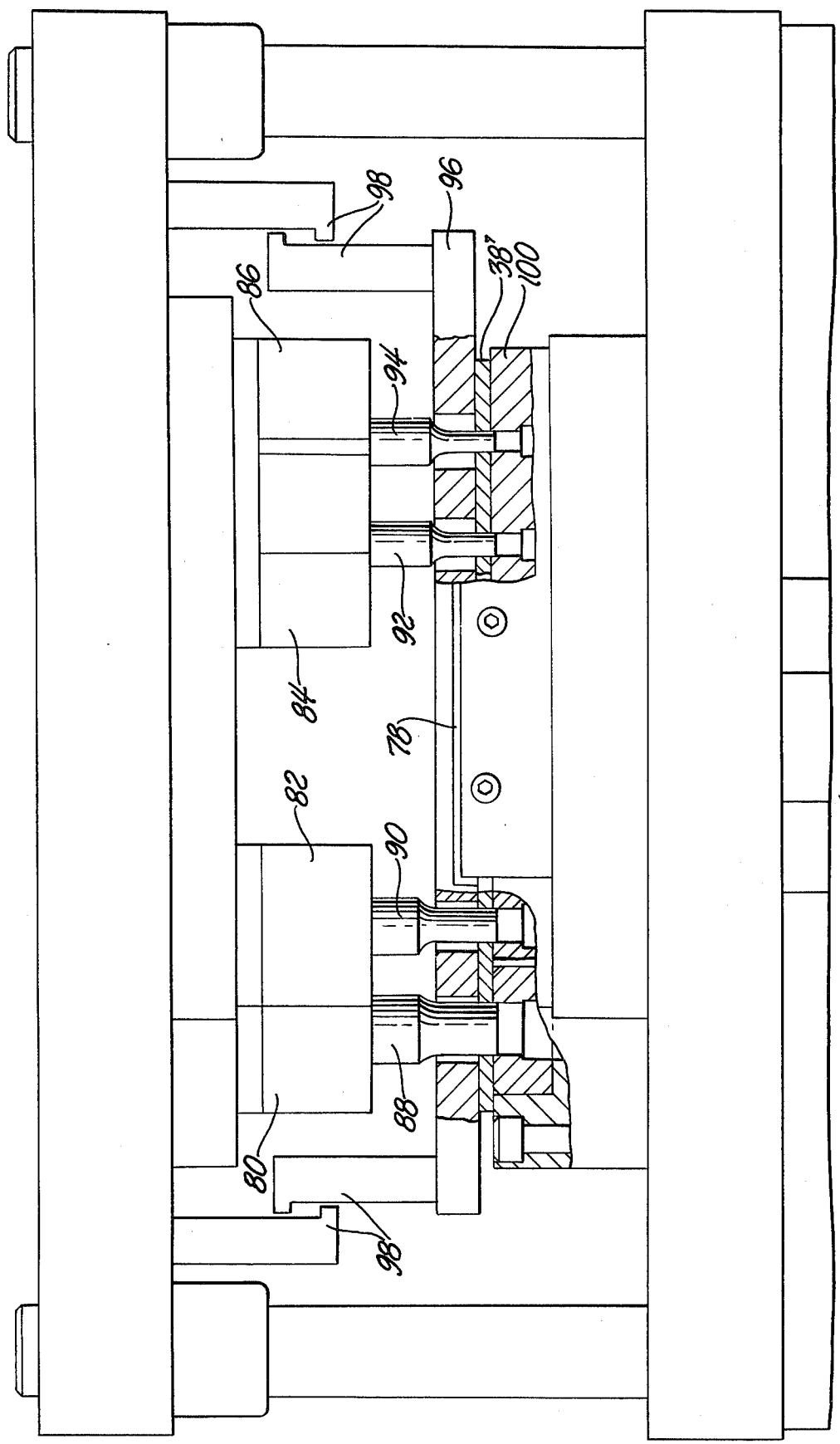

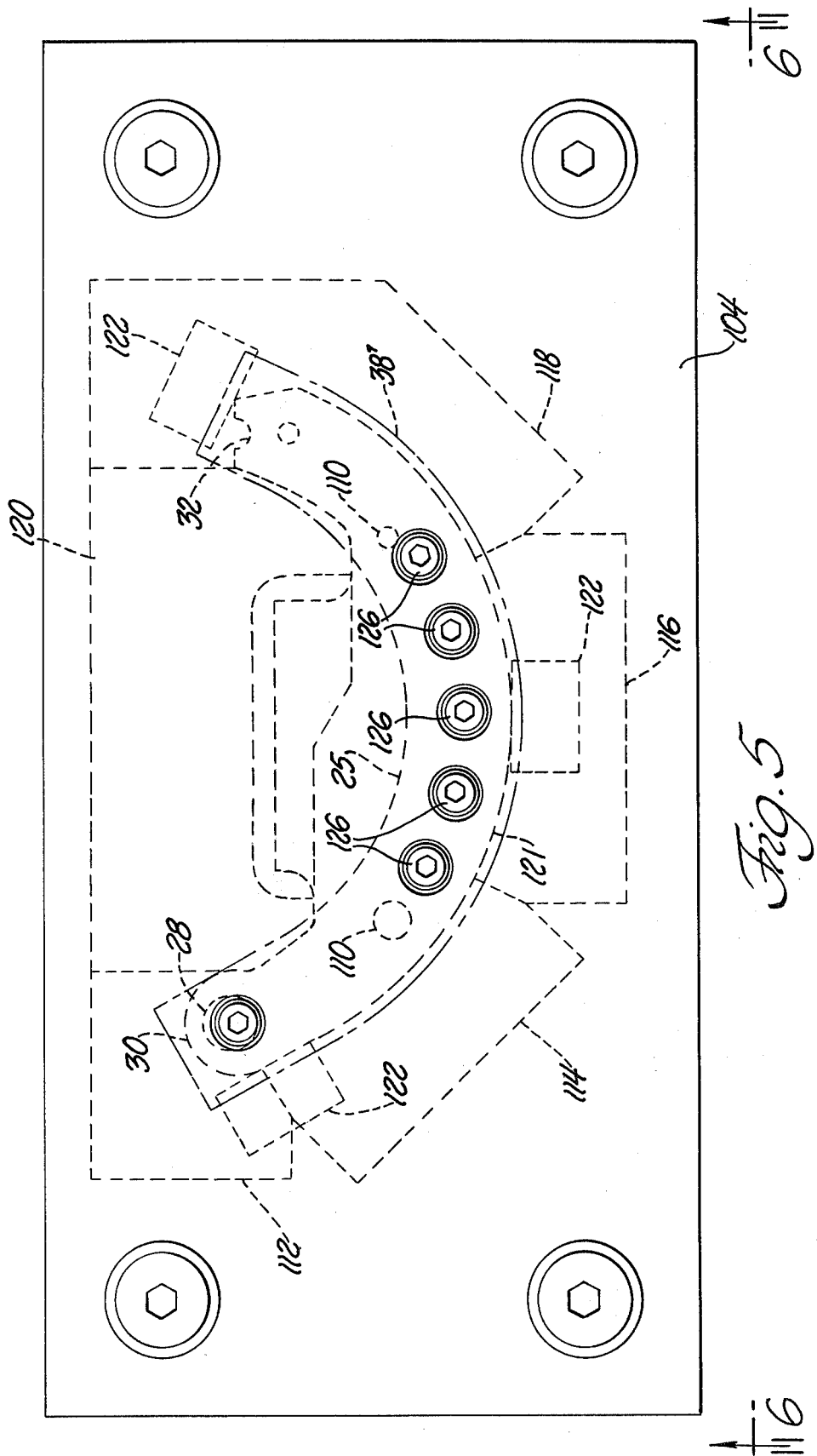

BRAKE SHOE ASSEMBLY, APPARATUS AND METHOD FOR MAKING SAME

BACKGROUND OF THE INVENTION

(1) Field of the Invention

The subject invention relates to a brake shoe assembly of the type utilized in automotive vehicles including large trucks and off-the-road equipment wherein the brake shoe assembly includes an arcuate plate upon which a brake lining is secured with a structure secured to the inside radius of the arcuate plate for supporting the brake shoe within a brake drum for pivotal movement between a position with the lining engaging the drum and a position with the lining spaced from and out of engagement with the drum.

(2) Description of the Prior Art

Such brake shoe assemblies are known to the prior art wherein the assembly includes a pair of spaced parallel arcuate rib members secured to the inside radius of the arcuate plate member which supports the brake lining. The arcuate rib members are welded or secured in a similar fashion to the arcuate plate. The arcuate ribs in such assembly have been made by shearing or otherwise punching out in a press the ribs from a plate of metal with the ribs being in the final desired configuration and only needing working surfaces to be finish machined. A plurality of such arcuate ribs are severed out of a plate; however, a great deal of waste material surrounds the arcuate ribs punched out of the plate, this waste material is expensive and must be disposed of.

SUMMARY OF THE INVENTION

The subject invention provides a brake shoe assembly and a method and apparatus for making same wherein the arcuate ribs of the brake shoe assembly are stronger than the previous ribs by having a greater thickness on the inside radii than at the outside radii as a result of efficiently and economically bending a straight length of rectangular bar stock having opposite faces into an arcuate shaped member at a bending station while maintaining the bar stock substantially flat with the opposite faces extending transversely to the axis of bending and thereafter piercing a plurality of holes between the opposite faces of the arcuate member at a piercing station followed by trimming the outside periphery of the opposite faces of the arcuate member to a predetermined arcuate rib configuration at a trimming station and then finishing predetermined working surfaces at a finishing station whereby the material waste is dramatically reduced over other processes and a rib is produced having greater strength characteristics on the inside radius to thereby resist unbending forces which would tend to straighten the arcuate member.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a plan view of the bending station of the subject invention;

FIG. 2 is a view taken substantially along line 2—2 of FIG. 1 but showing a portion of the assembly broken away and in cross section;

FIG. 3 is a plan view of a piercing station of the subject invention;

FIG. 4 is a view taken substantially along line 4—4 of FIG. 3 but showing the assembly partially broken away and in cross section;

FIG. 5 is a plan view of the trimming station of the subject invention;

DESCRIPTION OF THE PREFERRED EMBODIMENT

Figure 9:
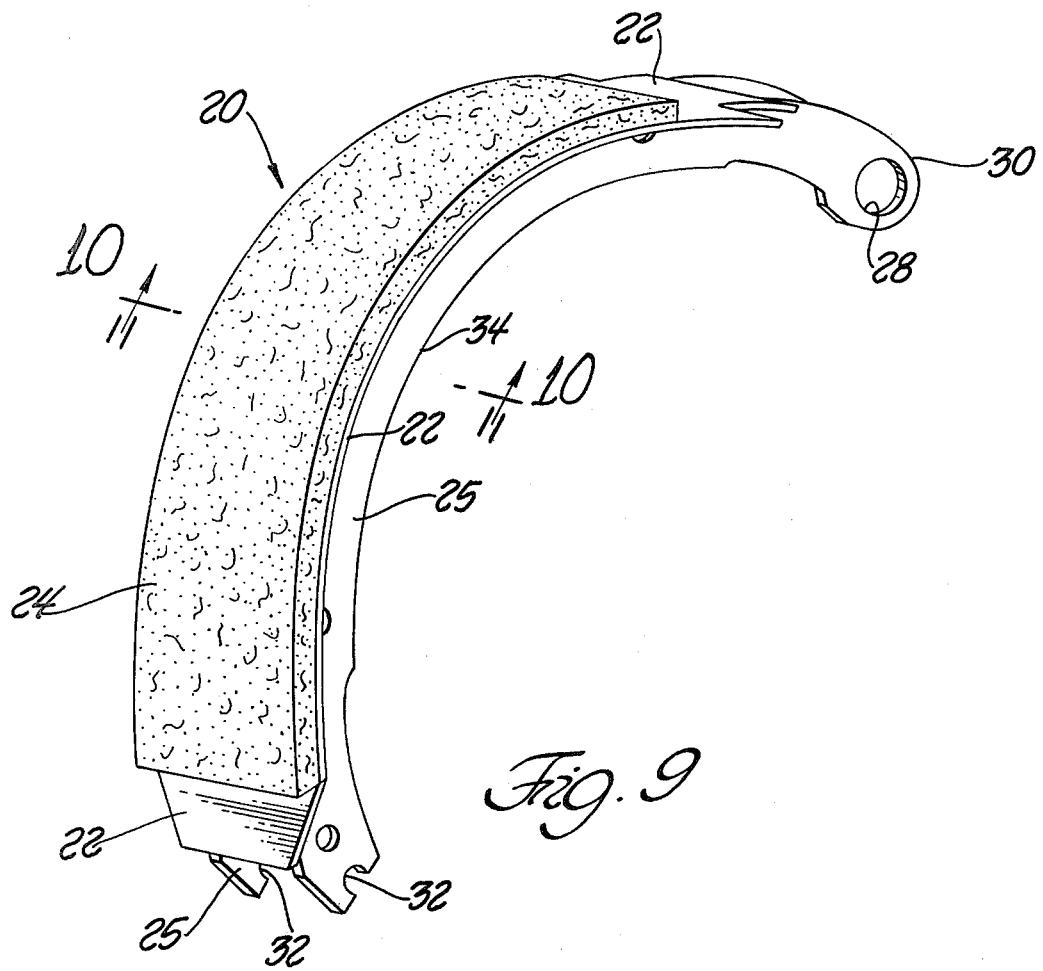
FIGS. 9 and 10 illustrate a brake shoe assembly made according to the invention.
Figure 10:
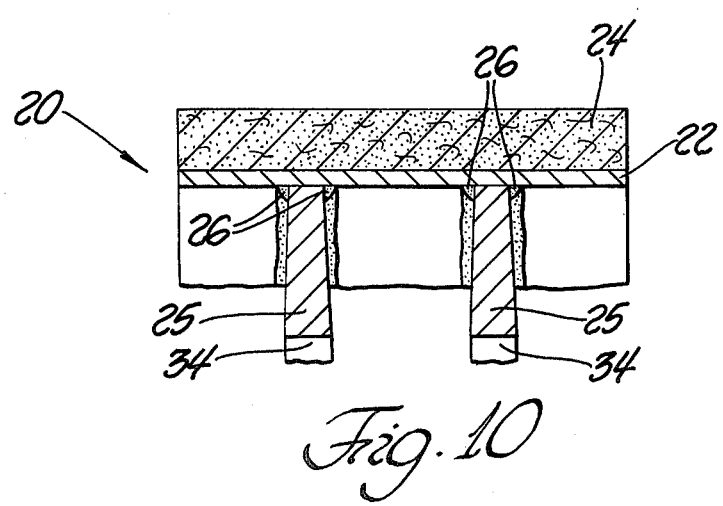

A brake shoe assembly which is constructed in accordance with the instant invention is generally shown at 20 in FIGS. 9 and 10. The brake shoe assembly 20 includes a brake shoe platform defined by an arcuate plate 22. The arcuate plate 22 follows the circumference of a circle and a frictional material or brake lining 24 is bonded or otherwise secured to the outside radius of the arcuate plate 22.

A pair of arcuate ribs 25 are disposed in parallel spaced relationship with one another and have outside radii secured to the inside radius of the brake shoe platform 22. The arcuate ribs 25 may be secured to the underside of the platform 22 by welding as indicated at 26 in FIG. 10. The ribs 25 are formed to have outside radii which conform to the inside radius of the platform 22 so as to be welded or otherwise secured thereto. The arcuate ribs 25 include working surfaces defined by a support hole 28 at one end of the rib which is surrounded by a semicircular portion 30 at the end of the rib 25 with the semicircular portion 30 being disposed about the hole 28. Another working surface comprising a notch 32 is disposed at the other end of each arcuate rib 25. The working surfaces 28 and 32 have machined finishes so that they may be utilized as working surfaces for attaching and/or supporting the brake shoe within a brake drum by way of the holes 28 and the notches 32.

Each arcuate rib 25 is thicker at the inside radius 34 than at the outside radius which is secured to and abuts the inside radius of the platform 22. As viewed in FIG. 9, if a force were applied to expand or drive the ends of the arcuate ribs 25 apart, the highest stresses would first occur at the inside radius 34 of the ribs 25 and as the inside radii 34 are thicker than the outside radii the arcuate ribs are stronger than known ribs having the same or a commensurate amount of material.

An apparatus for making the brake shoe assembly 20 is shown in FIGS. 1 through 8.

The apparatus includes a bending station generally shown at 36 in FIGS. 1 and 2. The bending station 36 bends a straight length of rectangular bar stock 38 into an arcuate shaped member 38'. The rectangular bar stock 38 has side extremities including sides and ends which extend transversely to and interconnect opposite faces or bottom and top faces. The bar stock 38 is bent into the arcuate shaped member 38' while maintaining the bar stock substantially flat with the opposite faces extending transversely to the axis of bending. The inside radius 34 of the arcuate member 38' increases in thickness during the bending thereof as it is placed in compression while at the same time outside radius of the arcuate member 38' is reduced in thickness and is placed in tension.

The bending station 36 includes a female anvil having a concave arcuate surface 40 and a male anvil 42 having a convex arcuate surface 44. The anvils are movable relative to one another as the male anvil 42 moves relative to the fixed female anvil defining the concave surface 40 between the open position illustrated in the right-hand portion of FIGS. 1 and 2 and the closed position illustrated in the left-hand portion of FIGS. 1 and 2. There are actually two bending stations or positions shown in FIGS. 1 and 2 with the two positions being opposed to one another but with each of the positions being identical. When in the open position illustrated in the righthand portion of FIGS. 1 and 2, the components are in position for receiving the bar stock 38. The male anvils 42 are moved from the open position illustrated in the right-hand portion of FIGS. 1 and 2 to the closed portion illustrated in the left-hand portion of FIGS. 1 and 2 for bending the bar stock 38 into the arcuate member 38'.

Each bending position includes a slide platform 46 and a slide cavity 48. The slide platform 46 is slidably supported in the slide cavity 48. More specifically, the slide cavity has a downwardly facing surface defined by the plate 50 with the downwardly facing surface having a recess 52 therein for defining the concave surface 40 of the female anvil. The assembly also includes a bottom plate 54 supported on cross beams 56. The bottom plate 54 includes a recess or opening 58 for allowing space for movement of an actuating rod 60. The sides 62 of the assembly define guides for movement of the platform members 56 into and out of the slide cavities 48.

The slide platforms 46 are moved between the open and closed positions by hydraulic cylinders 63 which move the rods 60 which are, in turn, connected by bolts 64 to the platforms 46.

The slide platforms 46 have upwardly facing surfaces 66 for sliding engagement with the downwardly facing surfaces of the cavities 48 with the anvils 42 being defined by raised portions which, in turn, define the convex surfaces 44 of the male anvils. The male and female anvils are horizontally aligned with one another and the anvils 42 move into and out of the recesses 52.

The bottom plates 54 define a floor portion in the slide cavities 48 and which floor portion is disposed under the slide platforms 46. The floor portions or bottom plates 54 have arcuate openings 68 therethrough and disposed beneath the female anvil, as defined by the concave surface 40, for allowing the arcuate member 38' to drop through the opening 68 when the slide platforms 46 are moved relative to one another to move the anvils to the open position. More specifically, the assembly includes retaining means for retaining the arcuate member 38' adjacent the female anvil or concave surface 40 as the male anvil 42 moves to the open position. The retainer means includes a spring-biased plunger assembly 70 having a plunger with a lower extremity or nose which is tapered as indicated at 72. As the bar stock 38 is moved against the concave surface 40 and is bent into the arcuate shape, its forward edge or side will engage the taper 72 of the plunger in the plunger assembly 70 to move the plunger upwardly as the bar stock moves therepast to the arcuate configuration shown at 38'. Once the male anvil 42 is retracted the plunger of the assembly 70 will engage the inside radius 34 of the arcuate member 38' to retain the arcuate member 38' in position above the opening 68 so that once the platform 46 clears the respective opening 68 the arcuate member 38' is cleared to move through the opening 68. In order to accomplish that movement, knockout means comprising knockout cylinders 74 are included and have plungers which may be actuated pneumatically, hydraulically or by way of a solenoid to push the arcuate members 38' downwardly through the respective openings 68.

As alluded to above, the assembly shown in FIGS. 1 and 2 include a pair of bending stations or positions which are disposed in opposing relationship to one another. The hydraulic cylinders 63 define actuating means for closing the male and female anvils of one bending station as illustrated in the left-hand portion of FIGS. 1 and 2 while simultaneously opening the anvils of the opposite bending station as shown at the right-hand portion of FIGS. 1 and 2 and vice versa.

The apparatus also includes a piercing station shown in FIGS. 3 and 4 for piercing a plurality of holes between the opposite top and bottom faces of the arcuate member 38'. The piercing station includes the stops 76 for engaging the ends of the arcuate member 38'. Also included is a spring-biased positioning member 78 which engages the outside radius of the arcuate member 38' for urging the arcuate member 38' against the stops 76 for positioning the arcuate member 38' for the piercing of holes therein. The positioning member may also be supported on the upper die part for engaging the arcuate member 38' just prior to the piercing operation.

The piercing station includes a plurality of punch support members 80, 82, 84 and 86 for supporting the punches 88, 90, 92 and 94 respectively. The punches 88, 90, 92 and 94 punch holes as clearly illustrated in FIG. 4 through the arcuate member 38'. The punch support members 88, 90, 92, and 94 are supported for vertical movement on an upper plate which, in turn, moves vertically on guides relative to a base which supports the lower die. The piercing station includes a platform or stripper plate 96 which engages the upper face of the arcuate member 38' to assure withdrawal of the punches from member 38' and which is thereafter lifted from the member 38' by the lost motion interconnect members 98 or the punches move upwardly from the lower die 100 which is, in turn, supported on an appropriate base. The assembly also includes an air actuated cylinder or workpiece removing device 102 which moves upwardly to elevate the arcuate member 38' from the positioning member 78 and stops 76 after the punches are removed from the member 38' after the punching operation has been completed.

The apparatus also includes a trimming station for trimming the outside periphery of the opposite faces of the arcuate member 38' to a predetermined arcuate rib configuration 25.

Figure 6:
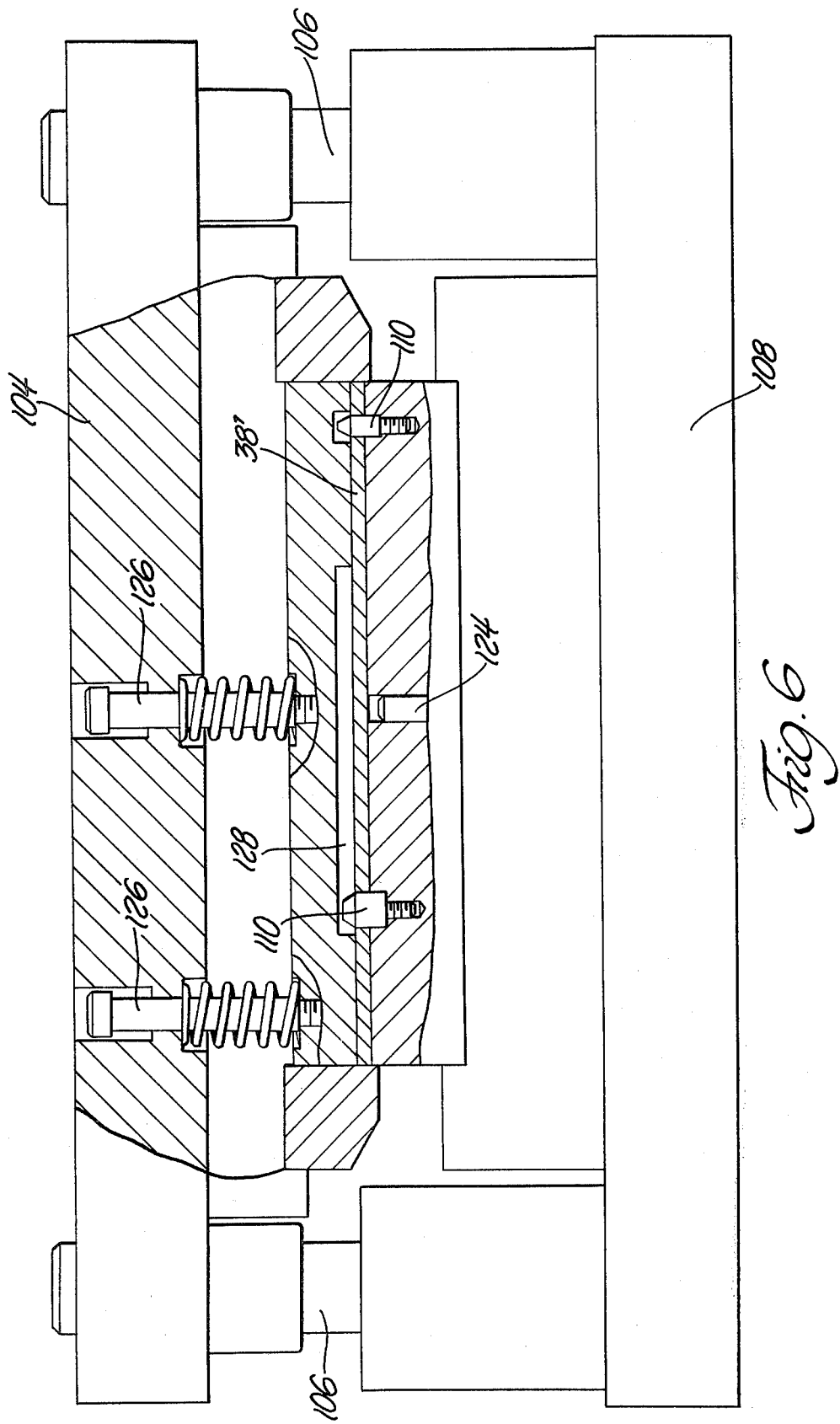
FIG. 6 is a view taken substantially along line 6—6 of FIG. 5 but showing the assembly partially broken away and in cross section.

The trimming station is shown in FIGS. 5 and 6. The trimming station includes an upper support member 104 which moves vertically on guide pins 106 relative to a base 108. The trimming station includes a plurality of locating pins 110 which engage the holes in the arcuate member 38' which resulted from the punching operation for locating the arcuate member 38' in the trimming station. The trimming station includes die components 112, 114, 116, 118 and 120 which define a trimming die for defining the arcuate rib configuration illustrated at 25 in FIG. 9. The arcuate rib has a predetermined outside radius 121 and a semicircular end portion 30 disposed about the support hole 28 at one end, the support hole 28 having been punched out by the die 88 during the punching operation. The trimming station also forms the opposite end of the arcuate rib 25 into a special configuration including the notch 32 at the opposite end of the arcuate rib. The trimming station also includes scrap cutters 122 for removing the material which is trimmed from the arcuate members 38' to define the arcuate rib 25, i.e., cutters 122 remove the trimmed material upwardly from around the lower die. The trimming station also includes a knockout device 124 for removing or ejecting the trimmed arcuate rib 25. An upper die component is supported through the springbiased sliding posts 126 with the upper die component including a relief cavity 128.

Figure 7:
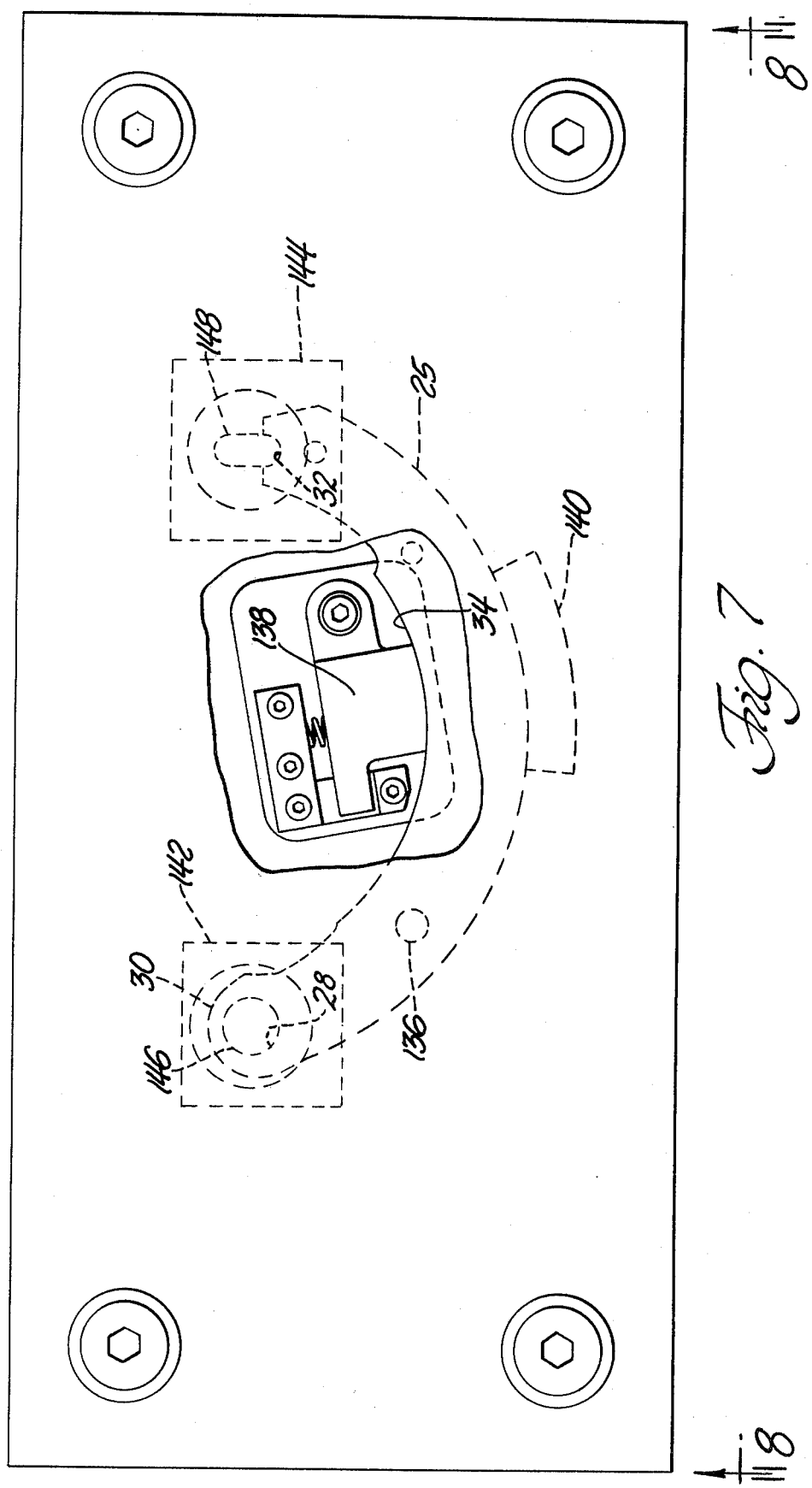
FIG. 7 is a plan view of the finishing station of the subject invention.
Figure 8:
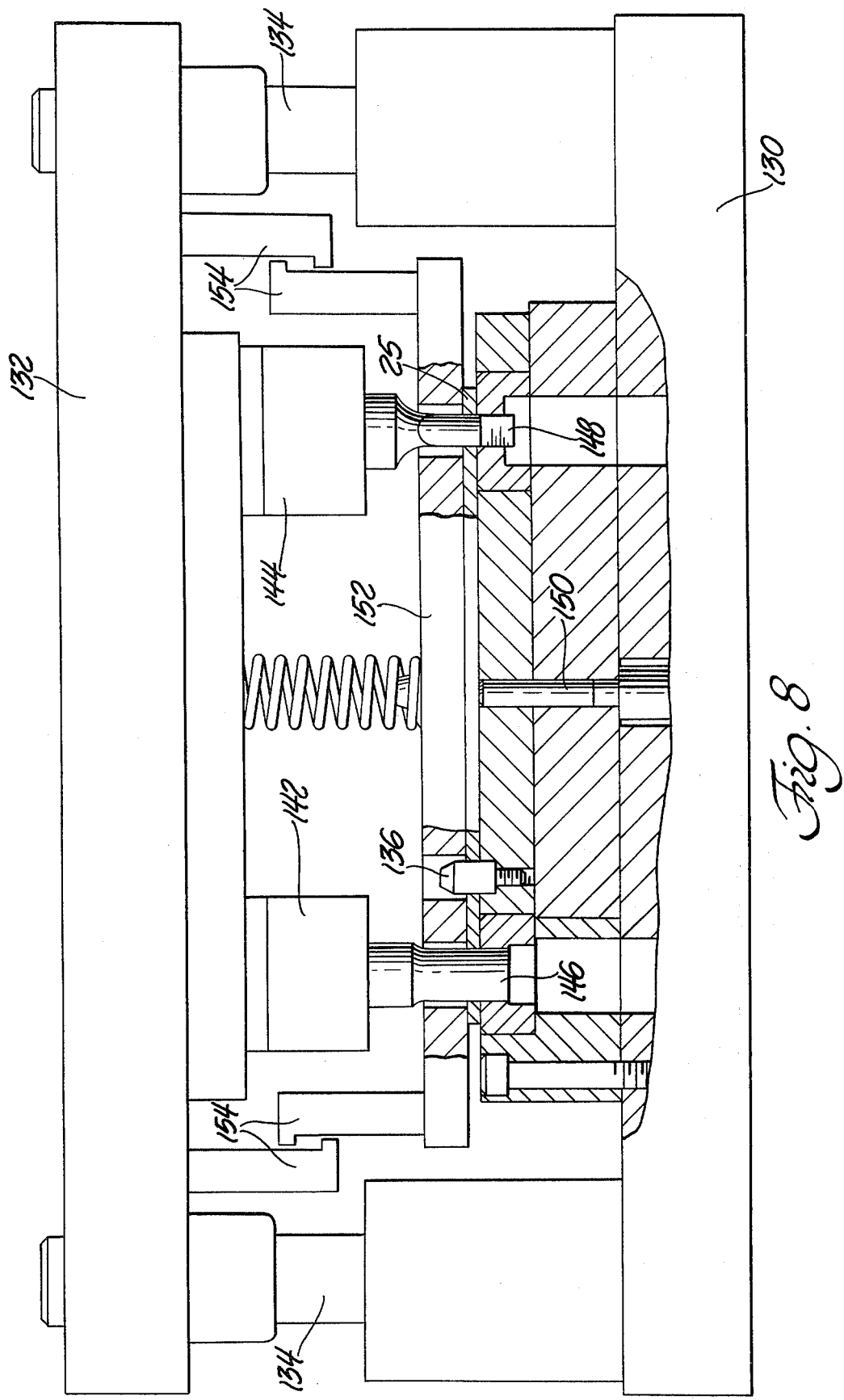
FIG. 8 is a view taken substantially along line 8—8 of FIG. 7 but showing the assembly partially broken away and in cross section.

The apparatus also includes a finishing station for finishing predetermined working surfaces which extend transversely to the opposite faces of the arcuate rib 25. The finishing station is shown in FIGS. 7 and 8. The finishing station includes a base 130 and an upper moving platform section 132 which moves vertically on the guides 134 relative to the base 130. The finishing station includes positioning means for positioning the arcuate rib 25 in the correct position for finishing predetermined working surfaces. Specifically, the positioning means includes the locating pin 136 which extends through a hole in the arcuate rib 25 as well as the springbiased member 138 which engages the inside radius 34 of the arcuate rib 25 for urging the arcuate rib 25 against the arcuate stop 140.

Tool supports 142 and 144 are supported by the upper movable member 132 and, in turn, support the finishing tools 146 and 148. The finishing tool 146 provides a machined finish on the working surface defined by the hole 28 at one end of the arcuate rib 25 whereas the finishing tool 148 provides a machined finish to the working surface defined by the notch 32 at the opposite end of the arcuate rib 25.

The finishing station also includes a knockout assembly 150 and a holding plate 152. The holding plate 152 maintains the arcuate rib 25 in position as the finishing tools 146 and 148 are moved vertically upwardly and out of contact with the arcuate rib 25. Once the finishing tools 146 and 148 are clear of the arcuate rib 25 the holding plate 152 is moved vertically upwardly by the lost motion interconnects 154, i.e., the same function as the plate 96.

In accordance with the instant invention a brake shoe assembly is made by bending a straight length of rectangular bar stock having opposite faces into an arcuate shaped member while maintaining the bar stock substantially flat with the opposite faces extending transversely to the axis of bending and thereafter piercing a plurality of holes between the opposite spaces of the arcuate member and then trimming the outside periphery of the opposite faces of the arcuate member to a predetermined arcuate rib configuration and finishing predetermined working surfaces which extend transversely to opposite faces of the arcuate rib. The arcuate member is located by engaging the holes therein while the trimming station for positioning the arcuate member relative to the holes prior to the trimming thereof. The arcuate member is trimmed into the arcuate rib with the predetermined outside radius and a semicircular portion 30 disposed about the support hole 28 which defines a working surface at one end and a notch 32 defining a working surface at the other end. The position of the support hole 28 may vary from one model of brake shoe 20 to another. When mounted for use the brake shoe 20 will pivot about the center of the hole 28 for different end uses. The hole 28 may be at different positions relative to the semicircular portion 30 and the hole 28 may or may not be concentric with the semicircular portion 30. However, the semicircular portion 30 provides clearance for pivotal movement of the brake shoe 20 and will always be disposed about the circular hole 28. After the arcuate ribs 25 are removed from the finishing station a pair of the arcuate ribs 25 are secured to the inside radius of the brake shoe platform 22 with the arcuate ribs 25 disposed in parallel spaced relationship to one another and with the outside radii thereof secured to the inside of the brake shoe platform 22.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

I claim:

1. An apparatus for making a brake shoe assembly comprising; a bending station for bending a straight length of rectangular bar stock having opposite faces into an arcuate shaped member while maintaining the bar stock substantially flat with the opposite faces extending transversely to the axis of bending, said bending station including a female anvil having a concave arcuate surface and a male anvil having a convex arcuate surface, said anvils being movable relative to one another between an open position for receiving the bar stock and a closed position for bending the bar stock into the arcuate member while moving to said closed position, said bending station including a slide platform and a slide cavity, said slide platform being slidably supported in said slide cavity, said slide cavity having a downwardly facing surface with a recess therein defining said concave surface of said female anvil, said slide platform having an upwardly facing surface for sliding engagement with said downwardly facing surface and a raised portion defining said convex surface of said male anvil, said male and female anvils being horizontally aligned, said slide cavity including a floor portion disposed under said slide platform, said floor portion having an arcuate opening therethrough and disposed beneath the female anvil for allowing the arcuate member to drop therethrough when said slide platform is moved to move said anvils to said open position.

2. An apparatus as set forth in claim 1 including retaining means for retaining the arcuate member adjacent said female anvil as said male anvil moves to said open position and knockout means for pushing the arcuate member away from said retaining means and into said arcuate opening in said floor portion.

3. An apparatus as set forth in claim 1 including a pair of said bending stations disposed in opposing relationship to one another and actuation means for closing said anvils of one bending station while opening said anvils of the opposite bending station and vice versa.

4. An apparatus comprising; a bending station for bending a straight length of rectangular bar stock having opposite faces into an arcuate shaped member, said bending station including a female anvil having a concave surface for receiving the edge of the arcuate member and a male anvil having a convex surface for engaging the opposite edge of the arcuate member, said anvils being movable relative to one another between an open position for receiving the bar stock and a closed position for bending the bar stock into the arcuate member while moving to the closed position, a slide cavity having a downwardly facing surface with a recess therein defining said concave surface of said female anvil, a slide platform slidably supported in said slide cavity for movement between said open and closed positions and having an upwardly facing surface in sliding engagement with said downwardly facing surface and a raised portion defining said convex surface of said male anvil, said male and female anvils being horizontally aligned, a pair of said bending stations being disposed in opposing relationship to one another and actuation means for closing said anvils of one bending station while opening said anvils of the opposite bending station and vice versa.

5. An apparatus as set forth in claim 4 wherein said slide cavity includes a floor portion disposed under said slide platform, said floor portion having an arcuate opening therethrough and disposed beneath the female anvil for allowing the arcuate member to drop therethrough when said slide platform is moved to move said anvils to said open position.

6. An apparatus as set forth in claim 5 including retaining means for retaining the arcuate member adjacent said female anvil as said male anvil moves to said open position and knockout means for pushing the arcuate member away from said retaining means and into said arcuate opening in said floor portion.

* * * * *